United States Patent Office 3,723,167
Patented Mar. 27, 1973

3,723,167
ACRYLATE-ESTER-SILOXANE-ESTER-ACRYLATE PAINT

John D. Nordstrom, Detroit, Mich., assignor to Ford Motor Company, Dearborn, Mich.
No Drawing. Continuation-in-part of abandoned applications Ser. No. 888,054 and Ser. No. 888,059, both Dec. 24, 1969. This application Oct. 1, 1971, Ser. No. 185,846
Int. Cl. B44d 1/50
U.S. Cl. 117—93.31      18 Claims

ABSTRACT OF THE DISCLOSURE

A novel siloxane-ester-acrylate paint binder resin that is crosslinkable with vinyl monomers by exposure to an electron beam is produced in a three step reaction. These resins may be produced by the process wherein (1) a hydroxy acrylate selected from $C_5$–$C_{12}$ monohydroxy acrylates which are esters of a $C_2$–$C_8$ diol and acrylic or methacrylic acid is reacted with a $C_4$–$C_{10}$ anhydride of a dicarboxylic acid, (2) the organic reaction product of the first reaction step is reacted with a $C_2$–$C_{21}$ diol, and (3) the organic reaction product of the second reaction step is reacted with a siloxane having two or more hydroxy or alkoxy functional groups per molecule. A second method for producing these resins also involves a three step reaction wherein (1) a siloxane having two or more hydroxy or alkoxy functional groups per molecule is reacted with a $C_2$–$C_{21}$ diol, (2) the siloxane-comprising reaction product of the first reaction step is reacted with a $C_4$–$C_{36}$ dicarboxylic acid or anhydride thereof, and (3) the siloxane-comprising reaction product of the second reaction step is reacted with either glycidyl acrylate, glycidyl methacrylate, or a $C_5$–$C_{12}$ monohydroxy acrylate which is the ester of a $C_2$–$C_8$ diol and acrylic or methacrylic acid.

---

This invention is a continuation-in-part of applications Ser. Nos. 888,054 and 888,059 both filed Dec. 24, 1969, now abandoned.

BACKGROUND OF THE INVENTION

Electron-curable siloxane-modified polyester paints have been disclosed by W. J. Burlant and I. H Tsou in U.S. Pats. 3,437,512 and 3,437,513. In one embodiment, they produce these resins by reacting a hydroxy or hydrocarbonoxy functional siloxane with a diol and then reacting the siloxane-comprising product with two different anhydrides, one of these being an alpha-beta olefinically unsaturated compound, e.g., maleic anhydride, which introduces the desired amount of alpha-beta olefinic unsaturation into the resin. In another embodiment, they produce the resin by reacting a hydroxylated polyester with a hydroxy or hydrocarbonoxy siloxane.

Electron-curable, siloxane-acrylate reaction products are disclosed in my copending U.S. patent application Ser. No. 776,779 filed Nov. 18, 1968, now Pat. No. 3,577,264. These materials are formed by reacting one molar part hydroxy functional or hydrocarbonoxy functional siloxane with, preferably at least two molar parts of, a hydroxy bearing ester of an alpha-beta, olefinically, unsaturated carboxylic acid.

It is one object of this invention to provide siloxane-comprising paints curable by electron beam radiation which exhibit improved adhesion to the substrate upon which they are cured.

It is another object of this invention to provide siloxane-comprising paints curable by electron-beam radiation which can be tailored to varying degrees of flexibility.

THE INVENTION

It has been discovered that improved adhesion, weatherability, curability and flexibility of paint film is obtained in an electron-beam cured coating comprising in combination vinyl monomers and a novel alpha-beta olefinically unsaturated siloxane-ester-acrylate resin hereinafter described in detail. Thus, this invention relates to painted articles of manufacture wherein the painted surface has high resistance to weathering, with the process of producing such painted surfaces, with the paint used in such process, and with a method for manufacturing the novel paint binder resins used in said paint. In particular, this invention is concerned with the painting of substrates of wood, metal, glass, shaped polymeric solids and fabrics of synthetic or natural fibers and the curing of the novel paints thereon.

The novel siloxane-ester-acrylate paint binder resins that are used herein are formed by a three step reaction. The resins can be formed in two ways. They may be produced by the process wherein (1) an acrylate selected from $C_5$–$C_{12}$ monohydroxy acrylates which are esters of a $C_2$–$C_8$ diol and acrylic or methacrylic acid is reacted with a $C_4$–$C_{10}$ anhydride of a dicarboxylic acid, (2) the organic reaction product of the first reaction step is reacted with a $C_2$–$C_{21}$ diol, and (3) the organic reaction product of the second reaction step is reacted with a siloxane having two or more hydroxy or alkoxy functional groups per molecule. A second method for producing theses resins also involves a three step reaction wherein (1) a siloxane having two or more hydroxy or alkoxy functional groups per molecule is reacted with a $C_2$–$C_{21}$ diol, (2) the siloxane-comprising reaction product of the first reaction step is reacted with a $C_4$–$C_{36}$ dicarboxylic acid or anhydride thereof, and (3) the siloxane-comprising reaction product of the second reaction step is reacted with either glycidyl acrylate, glycidyl methacrylate, or a $C_5$–$C_{12}$ monohydroxy acrylate which is the ester of a $C_2$–$C_8$ diol and acrylic or methacrylic acid.

In this application, the term "paint" is meant to include pigment and/or finely ground filler, the binder without pigment and/or filler or having very little of the same, which can be tinted if desired. Thus, the binder which is ultimately converted to a durable film resistant to weathering can be all or virtually all that is used to form the film, or it can be a vehicle for pigment and/or particulate filler material.

The siloxanes employed in the preparation of the binder have a reactive hydroxyl or an alkoxy group, advantageously a $C_1$ to $C_4$ and preferably $C_1$ to $C_2$ alkoxy group, bonded to at least two of its silicon atoms. The term "siloxane" as employed herein refers to a compound containing a

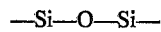

—Si—O—Si— linkage, with the remaining valences being satisfied by a hydrocarbon radical, a hydrocarbonoxy radical, hydrogen, a hydroxyl group, or an oxygen atom which interconnects the silicon atom providing such valence with another silicon atom. The siloxane may be either cyclic or acyclic. Suitable cyclic and acyclic siloxanes for use in this invention are described and illustrated in detailed in the aforementioned patents to W. J. Burlant and I. H. Tsou and elsewhere in the literature. The preferred siloxanes contain 2 to 5 hydroxy and/or alkoxy functional groups. The choice of reactants is advantageously arranged so that the siloxane comprises about 20 to about 60 weight percent of the binder resin produced in the three step reaction process.

The acrylate provides alpha-beta olefinic unsaturation to the resin. Suitable acrylates include 2-hydroxy ethyl acrylate or methacrylate, 2-hydroxy propyl acrylate or methacrylate, 2-hydroxy butyl acrylate or methacrylate, 2-hydroxy octyl acrylate or methacrylate, etc. In the method starting with reaction of the acrylate with the anhydride, the acrylate is employed in the reaction mix in substantially equimolar relationship with the anhydride and the reaction conditions are suitably mild to avoid forming a diacrylate ester with the anhydride. If minor amounts of such diacrylates are formed, they may be left in the reaction mix and eventually in the paint binder solution wherein combination with other vinyl monomers they improve adhesion of the paint film to the substrate.

The $C_4$–$C_{10}$, anhydride ordinarily consists solely of carbon, hydrogen and oxygen. Suitable anhydrides include maleic anhydride, succinic anhydride, phthalic anhydride, tetrahydrophthalic anhydride, 1,2-cyclohexane dicarboxylic acid anhydride, 1,3-cyclohexane dicarboxylic acid anhydride, 1,4-cyclohexane dicarboxylic acid anhydride, 5 - norbornene - 2,3 - dicarboxylic acid anhydride, etc. Halogen substituted anhydrides can also be used, e.g., chloromaleic anhydride, dichloromaleic anhydride, chlorendic anhydride, etc.

In this embodiment, the organic reaction product of the first reaction step is reacted with an equimolar amount of a $C_2$–$C_{21}$ diol. The diols used herein are preferably aliphatic diols consisting essentially of carbon, hydrogen and oxygen. Suitable diols include ethylene glycol, 1,2-propylene glycol, 1,3-propylene glycol, 1,3-butylene glycol, 2 - butene - 1,4 - diol, 1-4 butane diol, diethylene glycol, neopentyl glycol, 1,5-pentamethylene glycol, 1,6-hexamethylene glycol, decamethylene glycol, polyethylene glycols and polypropylene glycols. Aromatic diols may also be used, e.g., dimethylol benzenes, dihydroxy ethyl benzenes, etc.

The organic reaction product of the second reaction step is reacted with a hydroxy or alkoxy siloxane. Preferably, one molar amount of the organic product of the second reaction step is reacted with each molar amount of hydroxy or alkoxy functionality of the siloxane.

In the second embodiment, the $C_2$–$C_{21}$ diol employed in the first reaction step can be any of the diols heretofore mentioned for use in the first embodiment. Preferably, one molar amount of the diol is employed for each molar amount of hydroxy or alkoxy groups on the siloxane. The $C_4$–$C_{36}$ dicarboxylic acid or anhydride ordinarily consists solely of carbon, hydrogen and oxygen and may be either a saturated or an unsaturated acid or the anhydride thereof, e.g. fumaric acid, maleic anhydride, succinic anhydride, adipic acid, phthalic anhydride, tetrahydrophthalic anhydride, isophthalic acid, azelaic acid, sebacic acid, 1,2-cyclohexane dicarboxylic acid anhydride, 1,3-cyclohexane dicarboxylic acid anhydride, 1,4-cyclohexane dicarboxylic acid anhydride, 5-norbornene-2,3-dicarboxylic anhydride, 4-methyl-5-norbornene-2,3-dicarboxylic acid anhydride, and the so called "dimer" acids, particularly the $C_{36}$ dimer acids formed by union at midmolecule of two unsaturated $C_{18}$ monocarboxylic acids. Other suitable anhydrides includes chloromaleic anhydride, dichloromaleic anhydride, chlorendic anhydride, etc. Preferably, the acid or anhydride is employed in equimolar quantities relative to the diol in this embodiment. The acrylate used in the third reaction step of this embodiment may be either glycidyl acrylate, glycidyl methacrylate or a $C_5$–$C_{12}$ monohydroxy acrylate which is the ester of a $C_2$–$C_8$ diol and acrylic or methacrylate acid, e.g., 2-hydroxyethyl acrylate or methacrylate, 2-hydroxy propyl acrylate or methacrylate, 2-hydroxy butyl acrylate or methacrylate, 2-hydroxyoctyl acrylate or methacrylate, etc. In this embodiment, the acrylate reactant is preferably employed in a substantially 1:1 molar ratio with the residual reactive carboxyl groups on the siloxane-comprising reaction product of the second reaction step.

The flexibility of the cured paint film formed from the siloxane-ester-acrylate resin thus produced can be varied significantly by varying the molecular weight of the diol and/or the dicarboxylic acid or anhydride and/or the acrylate.

The siloxane-ester-acrylate resin thus produced is admixed with $C_5$–$C_{12}$ vinyl monomers to form a paint binder solution which is applied by conventional means, e.g., spraying, roll coating, etc., to a substrate and polymerized thereon by ionized radiation, preferably in the form of an electron beam having average energy in the range of about 100,000 to about 500,000 electron volts.

The vinyl monomers are preferably acrylic monomers, e.g., methyl methacrylate, ethyl acrylate, butyl acrylate, butyl methacrylate, 2-ethyl hexyl acrylate, the hydroxy acrylates previously mentioned for use in the third reaction step of resin preparation, etc., or a mixture of such acrylic monomers and vinyl hydrocarbons, e.g., styrene and alkylated styrenes such as vinyl toluene, alpha-methyl styrene, divinyl benzene, etc. Vinyl hydrocarbons can be used alone as the vinyl monomer component of the paint binder. In combination with monoacrylates and/or hydrocarbon monomers, one may also use a minor proportion of di-, tri-, or tetrafunctional acrylates. Also, in combination with acrylates and methacrylates there can be used minor amounts of other vinyl monomers such as acrylonitrile, acrylamide, methacrylonitrile, vinyl halides, e.g., vinyl chloride and vinyl carboxylates, e.g., vinyl acetate.

In preparing the paints of this invention, the alpha-beta olefinically unsaturated resin component may comprise up to about 90 weight percent of the paint binder solution on a pigment and particulate filler free basis and as low as about 10 weight percent. Preferably, the resin comprises about 40 to about 80 weight percent of the resin-monomer solution with the vinyl monomers comprising about 20 to about 60 weight percent of the same. It will be understood that other alpha-beta olefinically unsaturated polymers may be substituted for minor portion of the siloxane-ester-acrylate resin of this invention.

The abbreviation "mrad" as employed herein means 1,000,000 rad. The term "rad" as employed herein means that dose of radiation which results in the absorption of 100 ergs of energy per gram of absorber, e.g., coating film. The electron emitting means may be a linear electron accelerator capable of producing a direct current potential in the range hereinbefore set forth. In such a device, electrons are ordinarily emitted from a hot filament and accelerated through a uniform voltage gradient. The electron beam, which may be about ⅛ inch diameter at this point, can then be scanned in one or more directions and then passed through a metal window, e.g., aluminum, aluminum alloyed with a small amount of copper, a magnesium-thorium alloy of about 0.003 inch thickness.

The binder is preferably applied to the substrate and cured thereon as a continuous film of substantially even depth, preferably a depth in the range of about 0.1 to about 4.0 mils depending upon the substrate and the intended end use of the coated product. The film-forming binder solution should have a viscosity low enough to permit rapid application to the substrate in substantially even depth and, preferably, high enough so that a 1 mil (0.001 inch) film will hold upon a vertical surface without sagging. The viscosity of the binder is adjusted by varying the molecular weight of the resin or resins and/or by varying the relative concentrations of the resin component and/or by varying the relative concentration of dissimilar monomers within the vinyl monomer component. The binder is preferably applied to the substrate essentially free of non-polymerizable organic solvents and/or diluents.

This invention will be more fully understood from the following illustrative examples:

Example 1

A siloxane-ester-acrylate paint binder resin is prepared from the following materials:

| Resin I: | Parts by wt. |
|---|---|
| Methoxy functional siloxane [1] | 412 |
| Neopentyl glycol | 208 |
| Tetraisopropyl titanate | 0.8 |
| Maleic anhydride | 196 |
| Glycidyl methacrylate | 237 |
| Tetraethyl ammonium chloride | 2.7 |
| Hydroquinone | 0.3 |

[1] An acyclic polysiloxane having average molecular weight in the range of 700 to 800 with an average or 3–4 methoxy functional groups per molecule.

The siloxane and the neopentyl glycol are heated in a reactor fitted with a stirrer, thermometer, nitrogen sparge tube and an apparatus to collect volatile reaction products. The titanate catalyst is added when the temperature reaches 100° C. The temperature is gradually raised to 150° C. over a two hour period. In this period, 57 parts by weight volatiles are distilled out. The main portion of the distillate is methanol.

The product is cooled to 100° C. and the maleic anhydride is added. The reaction temperature is held at 120° C. for 3 hours when the titratable acid content is 2.2 milliequivalents per gram. The hydroquinone is added. A solution of tetraethyl ammonium chloride catalyst and glycidyl methacrylate are added dropwise over a one hour period maintaining the temperature at 120° C. After two additional hours at 120° C., the acid content has dropped to 0.1 milliequivalent per gram and the reaction is stopped.

A second siloxane-ester paint binder resin is prepared from the following materials using the same procedure outlined above:

| Resin II: | Parts by wt. |
|---|---|
| Methoxy functional siloxane used in Resin I | 412 |
| Neopentyl glycol | 170 |
| Tetraisopropyl titanate | 0.8 |
| Tetrahydrophthalic anhydride | 246 |
| Hydroquinone | 0.4 |
| Tetraethyl ammonium chloride | 2.6 |
| Glycidyl methacrylate | 230 |

Resin I and Resin II are dissolved in methyl methacrylate so that the resin content is 60 wt. percent and 75 wt. percent respectively. Clear films are drawn down on phosphated steel panels and cured thereon by exposure to a 275 kilovolt, 25 milliampere electron beam source in a nitrogen atmosphere and the results are compared below:

|  | Resin I | Resin II |
|---|---|---|
| Total dose | 10 Mrad | 10 Mrad. |
| Film thickness (mils) | 0.9 | 1.1 |
| Pencil hardness | H | F. |
| Solvent resistance (rubs with methyl ethylketone soaked rag) | 21 | 100 plus. |
| Reverse impact (inch pound) | Pass 20 | Fail 4. |
| ⅛ inch mandrel bend | Pass | Pass. |

Example 2

The procedure of Example 1 through the curing step is repeated except for the differences that the substrate is wood and the vinyl monomers employed comprise 75 weight percent of the paint binder solution and are a mixture of 2 molar parts methyl methacrylate, 2 molar parts of ethyl acrylate and 1 molar part of 2-ethylhexyl acrylate.

Example 3

The procedure of Example 1 through the curing step is repeated except that the paint binder solution contains 90 parts by weight of the siloxane-ester-acrylate and 10 parts by weight methyl methacrylate.

Example 4

The procedure of Example 1 through the curing step is repeated except that the paint binder solution contains 10 parts by weight of the siloxane-ester-acrylate binder solution and 90 parts by weight vinyl monomers consisting of 3 molar parts 2-ethyl hexyl acrylate, 2 molar parts butyl methacrylate, 1 molar part methyl methacrylate and 1 molar part styrene.

Example 5

The procedure of Example 1 through the curing step is repeated except for the difference that the substrate is glass, the vinyl monomers employed comprise 50 weight percent of the paint binder solution and are an equimolar mixture of methyl methacrylate, styrene and butyl acrylate, and the film-forming solution is pigmented with particulate titanium dioxide.

Example 6

The procedure of Example 1 through the curing step is repeated except for the difference that the substrate is polypropylene, an equimolar amount of poly-1,2-propylene glycol having about 21 carbon atoms per molecule is substituted for the neopentyl glycol in the first step of resin preparation, and an equimolar amount of succinic anhydride is substituted for the maleic anhydride in the second step of resin preparation.

Example 7

The procedure of Example 1 through the curing step is repeated except for the differences that the substrate is cotton fabric, an equimolar amount of 1,3-butylene glycol is substituted for the neopentyl glycol in the first step of resin preparation, an equimolar amount of a $C_{36}$ dimer of $C_{18}$ unsaturated acids is substituted for the maleic anhydride in the second step of resin preparation and an equimolar amount of glycidyl acrylate is substituted for the glycidyl methacrylate in the third step of resin preparation.

Example 8

The procedure of Example 1 through the curing step is repeated except that the vinyl monomer component of the paint binder solution is a mixture of 3 molar parts methyl methacrylate, ½ molar part vinyl toluene, ½ molar part divinyl benzene, ½ molar part hydroxyethyl methacrylate and ½ molar part vinyl acetate and an equimolar amount of adipic acid is substituted for the maleic anhydride of the second step of resin preparation.

Example 9

The procedure of Example 1 through the curing step is repeated except that the siloxane employed in the first reaction step of resin preparation is a commercially available (Dow Corning Z-6018) hydroxy-functional, cyclic, polysiloxane having the following properties:

| Hydroxy content, Dean-Stark: | |
|---|---|
| Percent condensible | 5.5 |
| Percent free | 0.5 |
| Average molecular weight | 1600 |
| Combining weight | 400 |
| Refractive Index | 1.531–1.539 |
| Softening point, Durran's mercury method, degrees F. | 200 |
| At 60% solids in xylene: | |
| Specific gravity at 77° F. | 1.075 |
| Viscosity at 77° F., centipoises | 33 |
| Gardner-Holdt | A–1 |

This siloxane is substituted for a functionally equivalent amount of the siloxane of Example 1.

Example 10

A siloxane-ester-acrylate resin is prepared from the following materials:

Resin III:                                      Parts by wt.
  Siloxane (same as Example 1) _____ 412
  Neopentyl glycol _____ 208
  Tetraisopropyl titanate _____ 0.8
  Maleic anhydride _____ 196
  Hydroxyethyl acrylate _____ 200
  Hydroquinone _____ 0.3

The procedure of preparation are identical with those of Example 1 through the addition of hydroquinone. The hydroxyethyl acrylate and 450 parts by weight of toluene are then added. The hydroxyethyl acrylate and 450 parts by weight of toluene are then added. A Barrett receiver is placed on the reaction flask. The reaction mix is heated at reflux until the acid value of the material indicates that 90% of the esterification has occurred. The toluene solvent is removed by vacuum distillation and the resultant resin is dissolved in 400 parts of methyl methacrylate. The resin-monomer solution is applied to steel panels and cured under the same condition as in Example 1 except that the electron beam having average energy of about 325 kilovolts. Films of 0.2, 0.7, 0.9, 1.5, 2.5 and 4-mils average thickness are thus irradiated.

Example 11

The procedure of Example 10 is repeated except for the differences that a functionally equivalent amount of the siloxane of Example 9 is substituted for the siloxane of Example 1, an equimolar amount of a polyethylene glycol having an average of about 20 carbon atoms per molecule is substituted for the neopentyl glycol in the first step of resin preparation, an equimolar amount of azelaic acid is substituted for the maleic anhydride in the second reaction step of resin preparation and an equimolar amount of 2-hydroxyoctyl acrylate is substituted for the hydroxyethyl acrylate.

Example 12

The procedure of Example 10 is repeated except for the difference that the paint binder solution consists of 20 parts by weight methyl methacrylate and 80 parts by weight of the siloxane-ester-acrylate resin.

Example 13

The procedure of Example 10 is repeated except for the difference that the paint binder solution consists of 60 parts by weight methyl methacrylate and 40 parts by weight of the siloxane-ester-acrylate resin.

Example 14

The procedure of Example 10 is repeated except for the differences that an equimolar amount of 1,6-hexamethylene glycol is substituted for the neopentyl glycol in the first step of resin preparation and an equimolar amount of 2-hydroxyoctyl methacrylate is substituted for the hydroxyethyl acrylate in the third step of resin preparation.

Example 15

The procedure of Example 10 is repeated except for the difference that an equimolar amount of hydroxyethyl methacrylate is substituted for the hydroxyethyl acrylate in the third step of resin preparation.

Example 16

The procedure of Example 10 is repeated except for the difference that an equimolar amount of hydroxypropyl methacrylate is substituted for the hydroxyethyl acrylate in the third step of resin preparation.

Example 17

The procedure of Example 10 is repeated except for the difference that an equimolar amount of hydroxypropyl acrylate is substituted for the hydroxyethyl acrylate in the third step of resin preparation.

Example 18

The procedure of Example 10 is repeated except for the difference that hydroxybutyl acrylate is substituted for the hydroxyethyl acrylate in the third step of resin preparation.

Example 19

The procedure of Example 10 is repeated except for the difference that hydroxybutyl methacrylate is substituted for the hydroxyethyl acrylate in the third step of resin preparation.

Example 20

A siloxane-ester-acrylate paint binder resin is prepared from the following materials:

Resin IV:                                      Parts by wt.
  Methoxy functional siloxane [1] _____ 412
  Neopentyl glycol _____ 208
  Succinic anhydride _____ 200
  Hydroxypropyl acrylate _____ 260
  Hydroquinone _____ 0.4
  Tetraisopropyl titanate _____ 0.8
  Xylene _____ 300

[1] An acyclic polysiloxane having average molecular weight of 700–800 with an average of 3–4 methoxy groups per molecule.

The hydroxypropyl acrylate and succinic anhydride are mixed together in a reactor fitted with a thermometer, nitrogen inlet tube, stirrer and Barrett water trap. The hydroquinone is added and the reactants heated for three hours at 95° C. to form the half ester. The xylene and neopentyl glycol are added and the dispersion is brought to reflux. The water of condensation from the esterification reaction is removed by heating at 120° C. at reduced pressure. Finally, the siloxane and titanate catalyst are added. The reaction temperature is raised from 120° C. to 150° C. over a two hour period, during which 60 parts of distillate are removed in the Barrett water trap. The product is dissolved in 400 parts of butyl acrylate.

A one mil (0.001 inch) wet film of the resultant solution is applied to the surface of a steel panel and cured to a tack free coating with exposure to 10–12 megarads from a 275 kilovolt, 25 milliampere electron source in a nitrogen atmosphere.

Example 21

The procedure of Example 20 is repeated except for the difference that an equivalent amount of maleic anhydride is substituted for the succinic anhydride in the first step of resin preparation.

Example 22

The procedure of Example 20 is repeated except for the differences that an equivalent amount of tetrahydrophthalic anhydride is substituted for the succinic anhydride in the first step of resin preparation and the vinyl monomer component of the paint binder solution is a mixture of 3 molar parts methyl methacrylate, ½ molar part vinyl toluene, ½ molar part divinyl benzene, ½ molar part divinyl benzene, ½ molar part hydroxyethyl methacrylate and ½ molar part vinyl acetate.

Example 23

The procedure of Example 20 is repeated except for the differences that the substrate is wood and the vinyl monomers employed comprise 75 weight percent of the paint binder solution and are a mixture of 2 molar parts methyl methacrylate, 2 molar parts of ethyl acrylate and 1 molar part of 2-ethylhexyl acrylate.

Example 24

The procedure of Example 20 is repeated except that the paint binder solution contains 90 parts by weight of the siloxane-ester-acrylate and 10 parts by weight methyl methacrylate.

Example 25

The procedure of Example 20 is repeated except that the paint binder solution contains 10 parts by weight of the siloxane-ester-acrylate binder solution and 90 parts by weight vinyl monomers consisting of 3 molar parts 2-ethyl hexyl acrylate, 2 molar parts butyl methacrylate, 1 molar part methyl methacrylate and 1 molar part styrene.

Example 26

The procedure of Example 20 is repeated except for the difference that the substrate is glass and the vinyl monomers employed comprise 50 weight percent of the paint binder solution and are an equimolar mixture of methyl methacrylate, styrene and butyl acrylate.

Example 27

The procedure of Example 20 is repeated except for the differences that the substrate is polypropylene, an equimolar amount of poly-1,2-propylene glycol having about 21 carbon atoms per molecule is substituted for the neopentyl glycol in the second step of resin preparation.

Example 28

The procedure of Example 20 is repeated except for the differences that the substrate is cotton fabric, an equimolar amount of 4-methyl-5-norbornene-2,3-dicarboxylic anhydride is substituted for succinic anhydride in the first step of resin preparation and an equimolar amount of 1,3-butylene glycol is substituted for the neopentyl glycol in the second step of resin production.

Example 29

The procedure of Example 20 is repeated except that the siloxane employed in the third reaction step of resin preparation is a commercially available (Dow Corning Z-6018) hydroxy functional, cyclic, polysiloxane having the following properties:

Hydroxy content, Dean-Stark:
    Percent condensible _____ 5.5
    Percent free _____ 0.5
Average molecular weight _____ 1600
Combining weight _____ 400
Refractive Index _____ 1.531–1.539
Softening point, Durran's mercury method, degrees
 F. _____ 200
At 60% solids in xylene:
    Specific gravity at 77° F. _____ 1.075
    Viscosity at 77° F., centipoises _____ 33
    Gardner-Holdt _____ A–1

This siloxane is substituted for a functionally equivalent amount of the siloxane of Example 20.

Example 30

The procedure of Example 20 is repeated except for the difference that an equimolar amount of hydroxyethyl methacrylate is substituted for the hydroxypropyl acrylate in the first step of resin preparation.

Example 31

The procedure of Example 20 is repeated except for the difference that an equimolar amount of hydroxyethyl acrylate is substituted for the hydroxypropyl acrylate in the first step of resin preparation.

Example 32

The procedure of Example 20 is repeated except for the difference that an equimolar amount of hydroxypropyl methacrylate is substituted for the hydroxypropyl acrylate in the first step of resin preparation.

Example 33

The procedure of Example 20 is repeated except for the difference that an equimolar amount of 2-hydroxybutyl acrylate is substituted for the hydroxypropyl acrylate in the first step of resin preparation.

Example 34

The procedure of Example 20 is repeated except for the difference that an equimolar amount of 2-hydroxybutyl methacrylate is substituted for the hydroxypropyl acrylate in the first step of resin preparation.

Example 35

The procedure of Example 20 is repeated except for the difference that an equimolar amount of 2-hydroxyoctyl acrylate is substituted for the hydroxypropyl acrylate in the first step of resin preparation.

Example 36

The procedure of Example 20 is repeated except for the difference that an equimolar amount of 2-hydroxyoctyl methacrylate is substituted for the hydroxypropyl acrylate in the first step of resin preparation.

Example 37

The procedure of Example 20 is repeated except for the difference that an equimolar amount of polyethylene glycol having an average of about 20 carbon atoms per molecule is substituted for the neopentyl glycol in the second step of resin preparation.

Example 38

The procedure of Example 20 is repeated except for the difference that the paint binder solution consists of 20 parts by weight methyl methacrylate and 80 parts by weight of the siloxane-ester-acrylate resin.

Example 39

The procedure of Example 20 is repeated except for the differences that the paint binder solution consists of 60 parts by weight methyl methacrylate and 40 parts by weight of the siloxane-ester-acrylate resin, the film-forming solution is pigmented with particulate titanium dioxide, the electron beam has average energy of about 325 kilovolts and films having average thickness of 0.2, 0.7, 1.5, 2.5 and 4 mils are irradiated.

Example 40

The procedure of Example 20 is repeated except for the differences that an equimolar amount of 1,6-hexamethylene glycol is substituted for the neopentyl glycol in the second step of resin preparation.

It will be understood by those skilled in the art that changes can be made in the foregoing examples without departing from the spirit and scope of this invention as expressed in the appended claims.

I claim:

1. An article of manufacture comprising a substrate and an adherent coating of paint on an external surface thereof, said coating comprising the in situ formed polymerization product of a film-forming solution of 10 to 90 parts by weight vinyl monomers and 90 to 10 parts by weight of an alpha-beta olefinically unsaturated siloxane-ester-acrylate resin applied to said surface as a paint film and crosslinked thereon by exposing said film to ionizing radiation, said siloxane-ester-acrylate resin being formed by a method selected from a first method comprising (1) reacting a siloxane having at least two functional groups selected from hydroxyl groups and alkoxy groups with a $C_2$–$C_{21}$ diol, (2) reacting the resultant siloxane-comprising reaction product of the first reaction step with a $C_4$–$C_{36}$ dicarboxylic acid or anhydride thereof, and (3) reacting the resultant siloxane-comprising reaction product of the second reaction step with an acrylate selected from the group consisting of glycidyl acrylate, glycidyl methacrylate and $C_5$–$C_{12}$ monohydroxy esters of a $C_2$–$C_8$ diol and acrylic or methacrylic acid and a second method comprising (a) reacting an acrylate selected from $C_5$–$C_{12}$ monohydroxy esters of acrylic or methacrylic acid and a $C_2$-$C_8$ diol with a $C_4$-$C_{10}$ anhydride of a dicarboxylic acid to obtain a monocarboxylic reaction product, (b) reacting said monocarboxylic reaction product with a $C_2$-$C_{21}$ diol to obtain a monohydroxy reaction product, and (c) reacting said monohydroxy reaction product with a siloxane having two or more hydroxy or alkoxy functional groups per molecule.

2. An article of manufacture in accordance with claim 1 wherein said siloxane comprises about 20 to about 60 parts by weight of said resin and said $C_4$-$C_{36}$ dicarboxylic acid or anhydride thereof is a $C_4$-$C_{10}$ anhydride.

3. An article of manufacture in accordance with claim 1 wherein said film-forming solution consists essentially of 20 to 60 parts by weight of vinyl monomers and 80 to 40 parts by weight of said siloxane-ester-acrylate resin.

4. An article of manufacture in accordance with claim 1 wherein said vinyl monomers consist essentially of vinyl monomers selected from methyl methacrylate, ethyl acrylate, butyl acrylate, butyl methacrylate, 2-ethyl hexyl acrylate, 2-hydroxy ethyl acrylate, 2-hydroxy ethyl methacrylate, 2-hydroxy propyl acrylate, 2-hydroxy propyl methacrylate, 2-hydroxy butyl acrylate, 2-hydroxy butyl methacrylate, styrene, vinyl toluene, alpha-methyl styrene, divinyl benzene and mixtures thereof.

5. An article of manufacture in accordance with claim 1 wherein said substrate is selected from substrates of the group consisting of wood, metal, preformed synthetic polymeric solid, glass and fabric.

6. An article of manufacture in accordance with claim 1 wherein said siloxane contains an average of 2 to 5 of said functional groups per molecule.

7. A paint comprising particulate pigment and a film-forming solution consisting essentially of 10 to 90 parts by weight vinyl monomers and 90 to 10 parts by weight of siloxane-ester-acrylate formed by a method selected from a first method comprising (1) reacting a siloxane having at least two functional groups selected from hydroxyl groups and alkoxy groups with a $C_2$-$C_{21}$ diol, (2) reacting the resultant siloxane-comprising reaction product of the first reaction step with a $C_4$-$C_{36}$ dicarboxylic acid or anhydride thereof, and (3) reacting the resultant siloxane-comprising reaction product of the second reaction step with an acrylate selected from the group consisting of glycidyl acrylate, glycidyl methacrylate and $C_5$-$C_{12}$ monohydroxy esters of a $C_2$-$C_8$ diol and acrylic or methacrylic acid and a second method comprising (a) reacting an acrylate selected from $C_5$-$C_{12}$ monohydroxy esters of acrylic or methacrylic acid and a $C_2$-$C_8$ diol with a $C_4$-$C_{10}$ anhydride of a dicarboxylic acid to obtain a monocarboxylic reaction product, (b) reacting said monocarboxylic reaction product with a $C_2$-$C_{21}$ diol to obtain a monohydroxy reaction product, and (c) reacting said monohydroxy reaction product with a siloxane having two or more hydroxy or alkoxy functional groups per molecule.

8. A paint in accordance with claim 7 wherein said siloxane comprises about 20 to about 60 parts by weight of said resin and said $C_4$-$C_{36}$ dicarboxylic acid or anhydride thereof is a $C_4$-$C_{10}$ anhydride.

9. A paint in accordance with claim 7 wherein said film-forming solution consists essentially of 20 to 60 parts by weight of vinyl monomers and 80 to 40 parts by weight of said siloxane-ester-acrylate resin.

10. A paint in accordance with claim 7 wherein said vinyl monomers consist essentially of vinyl monomers selected from methyl methacrylate, ethyl acrylate, butyl, acrylate, butyl methacrylate, 2-ethyl hexyl acrylate, 2-hydroxy ethyl acrylate, 2-hydroxy ethyl methacrylate, 2-hydroxy propyl acrylate, 2-hydroxy propyl methacrylate, 2-hydroxy butyl acrylate, 2-hydroxy butyl methacrylate, styrene, vinyl toluene, alpha-methyl styrene, divinyl benzene and mixtures thereof.

11. A paint in accordance with claim 7 wherein said functional groups are hydroxyl groups and said siloxane contains 2 to 5 of said groups per molecule.

12. A paint in accordance with claim 7 wherein said functional groups are $C_1$ to $C_2$ alkoxy groups and said siloxane contains 2 to 5 of said groups per molecule.

13. A paint in accordance with claim 7 wherein said vinyl monomers consist essentially of esters of acrylic or methacrylic acid and a $C_1$ to $C_8$ alcohol.

14. A paint in accordance with claim 7 wherein said vinyl monomers consist essentially of esters of acrylic or methacrylic acid and a $C_1$ to $C_8$ alcohol.

15. A method for coating a substrate which comprises applying to the surface of said substrate to an average depth in the range of about 0.1 to 4 mils a film-forming solution consisting essentially of 10 to 90 parts by weight vinyl monomers and 90 to 10 parts by weight siloxane-ester-acrylate resin and cross-linking said vinyl monomers and said resin upon said surface by exposing said coating to an electron beam having average energy in the range of about 100,000 to about 500,000 volts, said siloxane-ester-acrylate resin being formed by a method selected from a first method comprising (1) reacting a siloxane having at least two functional groups selected from hydroxyl groups and alkoxy groups with a $C_1$-$C_{21}$ diol, (2) reacting the resulting siloxane-comprising reaction product of the first reaction step with a $C_4$-$C_{36}$ dicarboxylic acid or anhydride thereof, and (3) reacting the resultant siloxane-comprising reaction product of the second reaction step with an acrylate selected from the group consisting of glycidyl acrylate, glycidyl methacrylate and $C_5$-$C_{12}$ monohydroxy esters of a $C_2$-$C_8$ diol and acrylic or methacrylic acid and a second method comprising (a) reacting an acrylate selected from $C_5$-$C_{12}$ monohydroxy esters of acrylic or methacrylic acid and a $C_2$-$C_8$ diol with a $C_4$-$C_{10}$ anhydride of a dicarboxylic acid to obtain a monocarboxylic reaction product, (b) reacting said monocarboxylic reaction product with a $C_2$-$C_{21}$ diol to obtain a monohydroxy reaction product and (c) reacting said monohydroxy reaction product with a siloxane having two or more hydroxy or alkoxy functional groups per molecule.

16. A method in accordance with claim 15 wherein said substrate is wood.

17. A method in accordance with claim 15 wherein said functional groups are selected from hydroxyl groups and methoxy groups.

18. A method in accordance with claim 15 wherein said vinyl monomers consist essentially of vinyl monomers selected from methyl methacrylate, ethyl acrylate, butyl acrylate, butyl methacrylate, 2-ethyl hexyl acrylate, 2-hydroxy ethyl acrylate, 2-hydroxy ethyl methacrylate, 2-hydroxy propyl acrylate, 2-hydroxy propyl methacrylate, 2-hydroxy butyl acrylate, 2-hydroxy butyl methacrylate, styrene, vinyl toluene, alpha-methyl styrene, divinyl benzene and mixtures thereof.

References Cited
UNITED STATES PATENTS

| | | | |
|---|---|---|---|
| 3,075,941 | 1/1963 | Wynstra et al. | 117—132 BS |
| 3,437,512 | 4/1969 | Burlant et al. | 117—93.31 |
| 3,536,779 | 10/1970 | Bedikian et al. | 117—161 ZA |

ALFRED L. LEAVITT, Primary Examiner

J. H. NEWSOME, Assistant Examiner

U.S. Cl. X.R.

117—124 F, 132 BS, 138.8 A, 148, 161 ZA; 204—159.13, 159.16; 260—46.5 Y, 827